(No Model.)
J. B. SOSTMANN.
BUNG EXTRACTOR.
No. 441,113. Patented Nov. 18, 1890.
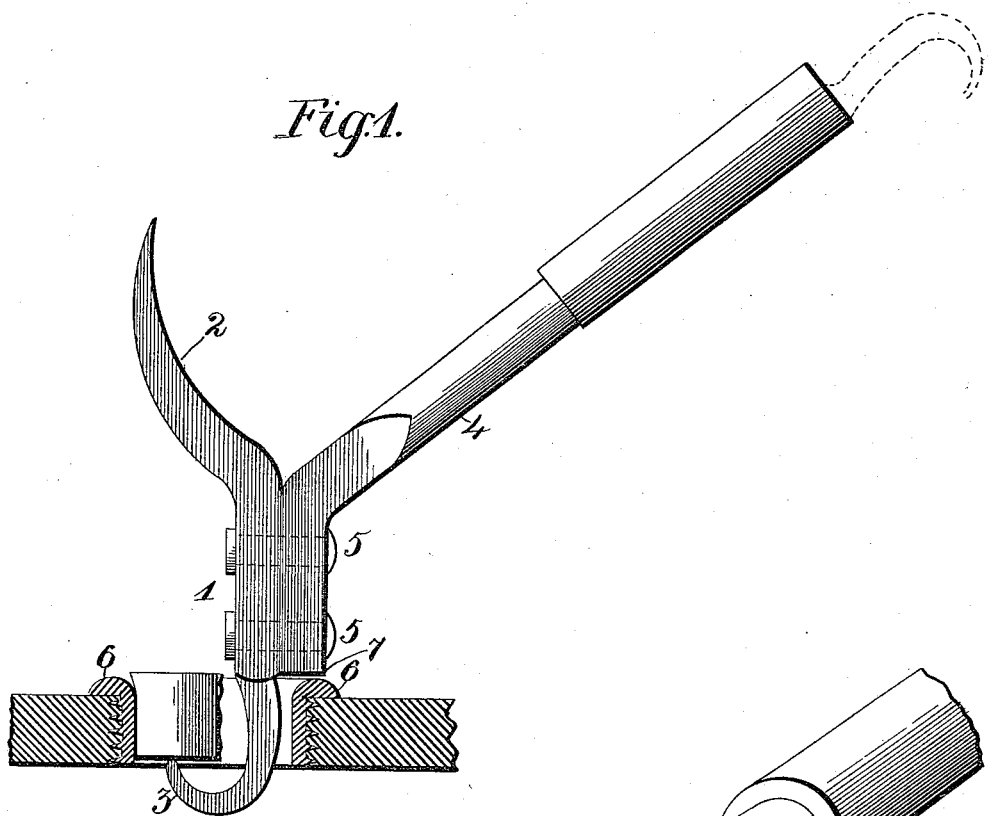
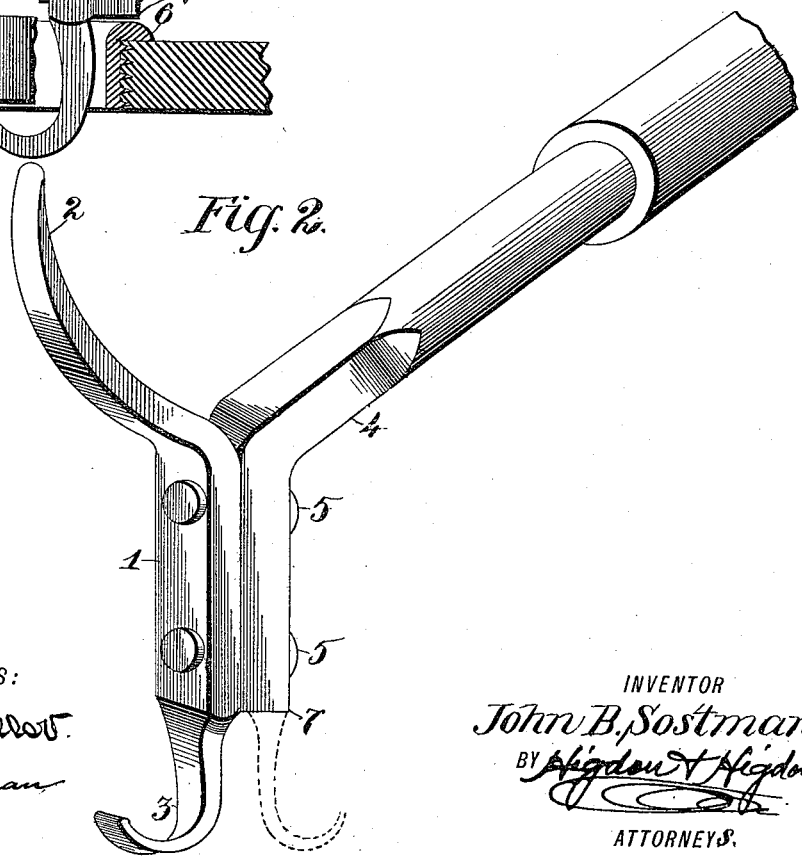
WITNESSES:
INVENTOR
John B. Sostmann
BY Higdon & Higdon
ATTORNEYS.

UNITED STATES PATENT OFFICE.

JOHN B. SOSTMANN, OF ST. LOUIS, MISSOURI, ASSIGNOR OF ONE-THIRD TO LOUIS HOFMAN, OF SAME PLACE.

BUNG-EXTRACTOR.

SPECIFICATION forming part of Letters Patent No. 441,113, dated November 18, 1890.

Application filed August 21, 1890. Serial No. 362,619. (No model.)

*To all whom it may concern:*

Be it known that I, JOHN B. SOSTMANN, of St. Louis, State of Missouri, have invented certain new and useful Improvements in Bung-Extractors, of which the following is a full, clear, and exact description, reference being had to the accompanying drawings, forming a part thereof.

My invention has for its object to provide a novel and simplified construction in bung-extractors; and it consists in the novel combination and arrangement of parts, as will be hereinafter fully described, and designated in the claim.

In the drawings, Figure 1 is a side elevation of my improved bung-extractor, illustrating the manner of applying the same and in position for extracting the bung. Fig. 2 is a perspective view of my invention.

The object of my invention is to provide an implement by means of which the ordinary wooden bung commonly used in beer-kegs may be extracted with perfect ease and with but very little labor on the part of the operator; and it consists of a bar of metal one end of which is sufficiently bent and sharpened to form a pick or chopper and the opposite end thereof a hook, the said bar being secured to a lever or handle between the said pick and hook, the details of which will be hereinafter more fully described.

Heretofore to accomplish the object aimed at a hook has been applied to the end of a long bar of metal and the bung extracted by cutting a portion of the same out of the bush, as in the present case, and inserting the said hook in the opening thus formed between the bung and bush, allowing the hook and bar secured thereto to fall to the opposite side of the keg and the bung extracted by applying sufficient force vertically to withdraw the same.

Referring to the drawings, 1 represents a bar of metal of sufficient size to answer the purpose for which it is designed, one end of which terminates in a sharpened edge and properly bent to form a pick or chopper 2, by means of which the bung is chopped partially out or reduced in size for the purpose of allowing sufficient space for the insertion of the hook 3. The lower portion of the bar 1 terminates in a hook 3, the end of which projects outward and in the same direction with the bent or curved portion of the picker 2.

4 represents a lever of sufficient length, the lower end of which is bent at an angle of about forty-five degrees, and the said portion fastened to the bar 1 between the chopper 2 and hook 3 by means of rivets or bolts 5, uniting the said lever and bar.

This implement may be constructed of one solid piece of metal by casting, welding, or otherwise, and thus dispense with the bolts or rivets.

In applying the implement the bung 5 is first partially chopped out or reduced by the chopper 2, allowing sufficient space between the said bung and bush 6 for the admission of the hook 3 of the extractor.

When the implement is in proper position for extracting the bung, as shown in Fig. 1, the heel 7 of the same will rest upon the upper or flared portion of the bush which forms the fulcrum of the lever, the hook 3 being located between the bung and bush, the end of which hook is in a position to be pressed against the lower surface of the bung, by which means the same is withdrawn when power is applied to the lever.

The hook 3 for extracting the bung may be placed at the extreme upper end of the lever 4, and the said handle at the rear of the said hook acts as the fulcrum for the same, as shown in Fig. 1.

This invention may be further modified by forming a hook on the extreme lower portion of the lever 4, as shown in dotted lines, Fig. 2, and the bar 1 acts as the fulcrum for the device, dispensing in this case with the hook, as shown in solid lines in said figure.

By the construction of the bung-extractor as shown the bung can be easily and successfully withdrawn by applying a slight pressure upon the lever, causing the hook to bear upon the lower portion of the said bung and the heel 7 of the lever to bear upon the bush or barrel.

Having fully described my invention, what I claim is—

In a bung-extractor, a lever constituting a handle, an offset portion at one end thereof, a hook at the lower end of the offset portion, a curved pointed chopper secured to said portion and projecting in a direction opposite to that of the hook, and a fulcrum formed on the offset at the base of the hook, substantially as described.

In testimony whereof I affix my signature in presence of two witnesses.

JOHN B. SOSTMANN.

Witnesses:
C. F. KELLER,
E. E. LONGAN.